3,330,887
REACTION PRODUCT OF AN ALKYLATED PHE-
NOL AND A PHOSPHATE AND PROCESS FOR
MAKING SAME
Wendell R. Conard, Kent, Ohio, assignor to The Fire-
stone Tire & Rubber Company, Akron, Ohio, a corpo-
ration of Ohio
Filed May 28, 1964, Ser. No. 370,866
8 Claims. (Cl. 260—920)

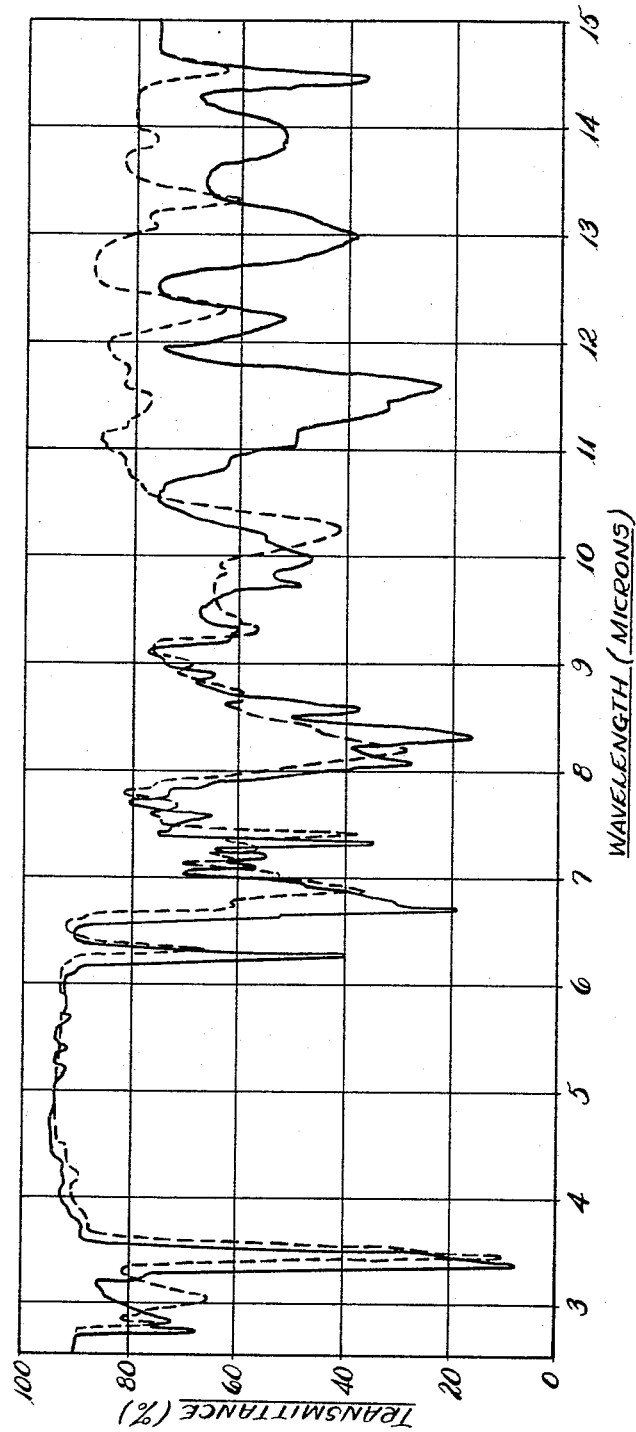

This invention relates to a polymer stabilizer, used in the light- and heat-stabilization of polymers such as, for example, polyethylene, polypropylene, high impact polystyrene, blends of styrene-acrylonitrile resins with butadiene-acrylonitrile elastomers, and ABS resin, which latter is a graft copolymer of acrylonitrile and styrene on polybutadiene. The stabilizer can be added to the latex reaction product, if the polymer is prepared in an aqueous emulsion, preferably after addition of a stopping agent, or it may be added to the dry polymer.

The stabilizer is a reaction product of an alkylated phenol polymer-stabilizer as a first component, and a phosphite polymer-stabilizer as a second component. These components are mixed in the ratio of 1 part of the phenol component to 0.1 to 4 parts of the phosphite component. During the alkylation of the phenol an amber color of greater or less intensity has been developed. On reacting this amber-colored phenol with the phosphite, the color is greatly reduced, and this is referred to herein as decolorizing. Heat is evolved during this reaction, indicating that an exothermic reaction takes place. Although the mixture of an alkylated phenol polymer-stabilizer and a phosphite polymer-stabilizer has stabilizing properties, the reaction product of the two is a better stabilizer, and an additional advantage, if the phenol is amber-colored, is that the phenol is decolorized.

The alkylated phenol is a mixed tertiary-alkylated phenol of the formula

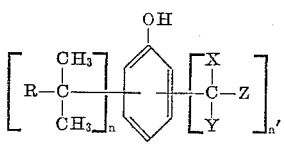

wherein $n$ and $n'$ are selected from the integers 1 and 2 and their total is no more than 3; X and Y are the same and are selected from the group consisting of hydrogen atoms and methyl radicals; Z is selected from the group consisting of a hydrogen atom, a methyl radical and an ethyl radical; and R is selected from the group consisting of amyl and hexyl radicals.

Of the alkylated phenol stabilizers, the mixed tertiary alkylated phenols are heavily hindered by tertiary octyl or nonyl, and preferably additionally by tertiary butyl or amyl groups. Such substitution can be effected by first reacting phenol under alkylating conditions with a tertiary octylene, such as diisobutylene or a tertiary nonylene, such as tripropylene and preferably subsequently with isobutylene or tertiary amylene. Particularly desirable alkylated phenols result from step-wise alkylation of phenol with diisobutylene and isobutylene in mol ratios of phenol:diisobutylene:isobutylene of 1:1:2 to 1:2:0. A preferred alkylated phenol is produced by reacting phenol:diisobutylene:isobutylene in the ratio of 1:2:1. These reactants may be used in other ratios to produce a suitable first component, such for example, as the following ratios: 1:1.25:1.75; 1:1.5:1.75; 1:2:0; 1:1:2; etc.

Although ordinarily phenol itself will be alkylated as above, similar tertiary-alkyl-hindered phenols suitable for use in the practice of the invention are produced by octylating, and if desired subsequently butylating, mixtures of phenols including cresols and xylenols such as occur in the lower boiling fractions of petroleum cresylic acids. Although, in the practice of the invention, hindered phenols suitable for the practice thereof are easily produced according to the above procedure, certain such suitable hindered phenols are commercially available, such as, for example, Wingstay T, an octylated, butylated phenol (the equivalent of the reaction product of phenol, isobutylene, and diisobutylene in the ratio of 1:2:1).

The alkylated phenol ordinarily is used in an amount of about 0.01 to about 5.0 parts by weight per 100 parts by weight of polymer, with from about 0.1 to about 1.33 parts by weight being preferred.

The second component is a phosphite polymer-stabilizer selected from the class of secondary- and tertiary-phosphites (which may be thio phosphites) having respectively the formulae

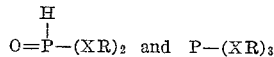

in which X is selected from the class consisting of oxygen and sulfur, and R is selected from the class consisting of alkyl groups of 1 to 20 carbon atoms, phenyl, and aralkyl and alkaryl groups comprising a phenol ring and at least one substituent with a total of 7 to 20 carbon atoms in the group. These include, for example:

Dimethyl phosphite
Dimethyl thiophosphite
The dibutyl phosphites
The dibutyl thiophosphites
Tri-iso-decyl phosphite
Diphenyl phosphite
Diphenyl thiophosphite
Diphenyl decyl phosphite
Didecyl phenyl phosphite
Di-2-ethylhexyl-phosphite
Tri-2-ethylhexylphosphite
Tridecyl thiophosphite
Di-nonylphenyl, phenyl phosphite
Distearyl phosphite
Tristearyl phosphite
Tristearyl thiophosphite
Tri-nonylphenyl phosphite
Di-benzyl phosphite
Tri-benzyl phosphite The components of the stabilizer are usually employed in the ratio of 1 part of the phosphite, by weight, to 2 parts of the alkylated phenol, although this ratio may vary from 1 part of the phosphite to 1 to 4 parts of the alkylated phenol.

Any suitable amount of the stabilizer reaction product may be used with a polymer, as for example from 0.5 to about 5 parts, by weight, of the reaction product to 100 parts of the polymer.

The alkylated phenol and phosphite are mixed and allowed to react before being added to the polymer. Heating accelerates the reaction and the mixture is preferably heated to at least 120° F. to speed the reaction.

The following example illustrates the invention.

Two parts (by weight) of an alkylated phenol produced by reacting 1 mole of phenol, 2 moles of diisobutylene and 1 mole of isobutylene (or equivalently 2 parts of Wingstay T) and 1 part (by weight) of diphenyl decyl phosphite are mixed and allowed to stand until the color has almost disappeared. An emulsion of the stabilizer is prepared from the following two solutions:

Solution A: Parts by weight
    Mixture of stabilizers _____ 65
    Oleic acid _____ 4.16
Solution B:
    Potassium hydroxide _____ 1.06
    Water _____ 33.6

The two solutions are separately heated to about 100° F. and solution B is slowly added to solution A with stirring. Any suitable emulsifier may be added, such as sodium lauryl sulfate. Other emulsifier may be employed instead of the potassium oleate. It is not necessary to use the reaction product as an emulsion.

For test purposes, two such stabilizer emulsions were used which were identical, except that one reaction product had stood until the color had substantially disappeared. These were added to separate portions of ABS resin latex obtained by copolymerizing a mixture of about 58 parts (by weight) of styrene and 26 parts of acrylonitrile with 16 parts (by weight) of polybutadiene. The resin to which the decolorized stabilizer had been added was more stable than the other when both were subject to light and heat tests. Whether added to the latex obtained by completion of the aqueous polymerization, or added to the separated copolymer, the light-colored mixtures of stabilizers give better heat- and light-stabilization than a fresh mixture of the stabilizers.

It is evident from the accompanying drawing that the stabilizer components react to produce a reaction product quite different from the respective stabilizers. The composition of the reaction product has not been determined. The drawing shows infra-red absorption curves for identically prepared mixtures of stabilizer components, one of which mixtures had stood until the amber color had changed to a light yellow. The mixtures were prepared by mixing 2 parts (by weight) of Wingstay T with 1 part (by weight) of diphenyl decyl phosphite. The fresh mixture, amber in color (due to the presence of Wingstay T), gave an APHA (American Public Health Association) color rating of 30 in a Hellige Aquatester. The other mixture was allowed to stand four months at room temperature, and then gave an APHA color rating of only 10 in the same device.

The accompanying drawing shows the infra-red curve of the fresh sample in a continuous dark line, with the infra-red curve of said reacted mixture superimposed upon it. This comparison of the two curves indicates a shift in the hydroxyl bond from 2.75–2.85 microns in the curve of the fresh mixture to 2.78–3.00 microns. The peaks at 6.3 and 6.7 microns were appreciably decreased by the reaction. Two of the peaks between 8 and 9 microns, usually associated with alkylated phenols disappeared and peaks of wave lengths greater than 10, usually associated with alkylated phenols, changed radically. This is clear evidence of the production of a reaction product which is corroborated by the change in color to a light color.

The change in color is gradual at room temperature, starting in about 0.5 to 6 hours, depending upon the ratio of Wingstay T (or other alkylated phenol) and phosphite, and the particular phosphite used.

The reaction is accelerated by heating, and in commercial operations, heating to a temperature in the range of 120 to 260° F., and preferably at about 200° F. is recommended.

Any of the phosphites of this invention will react with Wingstay T or other alkylated phenol polymer-stabilizer of this invention when allowed to stand at room temperature or on heating. The reacted stabilizers are more efficient light- and heat-stabilizers than a fresh mixture of the same. If the reaction product is lighter in color than the unreacted stabilizers, this is an added advantage.

For light stabilization, benzophenone, salicylates, etc. may be used with the reaction products of this invention.

The reacted polymer-stabilizers and mixtures thereof are useful in the stabilization of various polymers subject to light- and heat-decomposition, and are more effective than the freshly mixed stabilizers. One reacted stabilizer mixture may be added to a latex of the polymer and a different reacted stabilizer mixture can be incorporated in the same polymer latex, after drying.

What I claim is:

1. The reaction product of (1) 1 part of an alkylated-phenol polymer-stabilizer having the formula

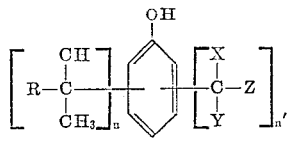

wherein $n$ and $n'$ are selected from the integers 1 and 2 and their total is no more than 3; X and Y are the same and are selected from the group consisting of hydrogen atoms and methyl radicals; Z is selected from the group consisting of a hydrogen atom, a methyl group and an ethyl group; and R is selected from the group consisting of amyl and hexyl radicals; and (2) 0.1 to 4 parts of a phosphite polymer-stabilizer from the class consisting of secondary and tertiary phosphites having, respectively, the formulae

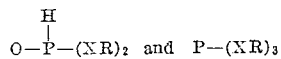

in which X is selected from the class consisting of oxygen and sulfur, and R is selected from the class consisting of alkyl groups of 1 to 20 carbon atoms, phenyl, and aralkyl and alkaryl groups comprising a phenol ring and at least one substituent with a total of 7 to 20 carbon atoms in the group.

2. The reaction product of claim 1 obtained from an octylated butylated phenol as the alkylated-phenol polymer-stabilizer.

3. The reaction product of claim 1 obtained with diphenyl decyl phosphite as the phosphite polymer-stabilizer.

4. The reaction product of claim 1 obtained with dibutyl phosphite as the phosphite polymer-stabilizer.

5. The process of producing a polymer-stabilizer which comprises mixing the reaction product of (1) 1 part of an alkylated-phenol polymer-stabilizer having the formula

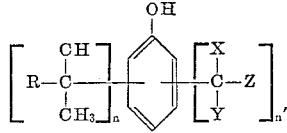

wherein $n$ and $n'$ are selected from the integers 1 and 2 and their total is no more than 3; X and Y are the same and are selected from the group consisting of hydrogen atoms and methyl radicals; Z is selected from the group consisting of a hydrogen atom, a methyl group and an ethyl group; and R is selected from the group consisting of amyl and hexyl radicals; and (2) 0.1 to 4 parts of a phosphite polymer-stabilizer from the class consisting of secondary and tertiary phosphites having, respectively, the formulae

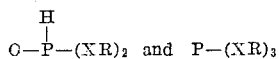

in which X is selected from the class consisting of oxygen and sulfur, and R is selected from the class consisting of alkyl groups of 1 to 20 carbon atoms, phenyl, and aralkyl and alkaryl groups comprising a phenol ring and at least one substituent with a total of 7 to 20 carbon atoms in the group.

6. The process of claim 5 in which the stabilizer is a reaction product obtained from an octylated butylated phenol as the alkylated-phenol polymer-stabilizer.

7. The process of claim 5 in which the stabilizer is a reaction product obtained from diphenyl decyl phosphite as the phosphite polymer-stabilizer.

8. The process of claim 5 in which the stabilizer is a reaction product obtained from dibutyl phosphite as the phosphite polymer-stabilizer.

No references cited.

CHARLES B. PARKER, *Primary Examiner.*

A. H. SUTTO, *Assistant Examiner.*